United States Patent [19]

O'Dell

[11] Patent Number: 5,454,694
[45] Date of Patent: Oct. 3, 1995

[54] VERTICAL AXIS WIND MILL WITH RETRACTABLE SAILS

[76] Inventor: Clarence E. O'Dell, 3573 S. Waverly Rd., Eaton Rapids, Mich. 48827

[21] Appl. No.: 203,384

[22] Filed: Mar. 1, 1994

[51] Int. Cl.⁶ .................................................. F03D 3/04
[52] U.S. Cl. .................. 416/197 A; 415/4.2; 415/4.4; 415/165; 290/55
[58] Field of Search ...................... 416/197 A, 142; 415/2.1, 4.1, 4.2, 4.4, 165, 186; 290/55

[56] References Cited

U.S. PATENT DOCUMENTS

| | | | |
|---|---|---|---|
| 326,166 | 9/1885 | Simpson | 415/4.1 |
| 640,901 | 1/1900 | Hardaway | 416/197 A |
| 1,595,578 | 8/1926 | Sovereign | 415/186 |
| 3,994,621 | 11/1976 | Bogie | 416/197 A |
| 4,269,563 | 5/1981 | Sharak et al. | 416/197 A |
| 4,496,848 | 1/1985 | Binder | 416/197 A |
| 5,038,049 | 8/1991 | Kato | 416/197 A |

FOREIGN PATENT DOCUMENTS

| | | | |
|---|---|---|---|
| 22654 | 8/1921 | France | 415/2.1 |
| 49378 | 3/1984 | Japan | 416/197 A |

*Primary Examiner*—F. Daniel Lopez
*Assistant Examiner*—James A. Larson

[57] ABSTRACT

A vertical axis wind mill with retractable sails comprising a central core which has vertical side walls in a generally cylindrical configuration. The core has an upper end and a lower end and a drive shaft positioned along the central axis therefor. The drive shaft has an upper end and a lower end. The core also has curved vanes extending radially outwardly therefrom for rotation under the force of the wind to rotate the core and the drive shaft. The device also includes a fixed support which receives the shaft through bearings to allow for rotation of the core while the upper support remains fixed. Also included is a housing with a generator located within the lower extent of the housing beneath the core. The generator has an upper end secured to the lower end of the shaft for generating electricity in response to rotation of the shaft. The sails are radially retracted by coiling up into a lower portion of a U-shaped bracket, with a drive system for raising and lowering the sails.

2 Claims, 6 Drawing Sheets

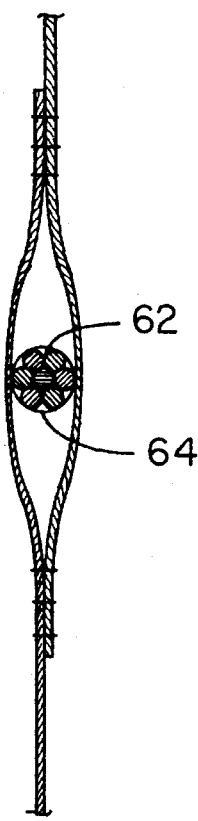
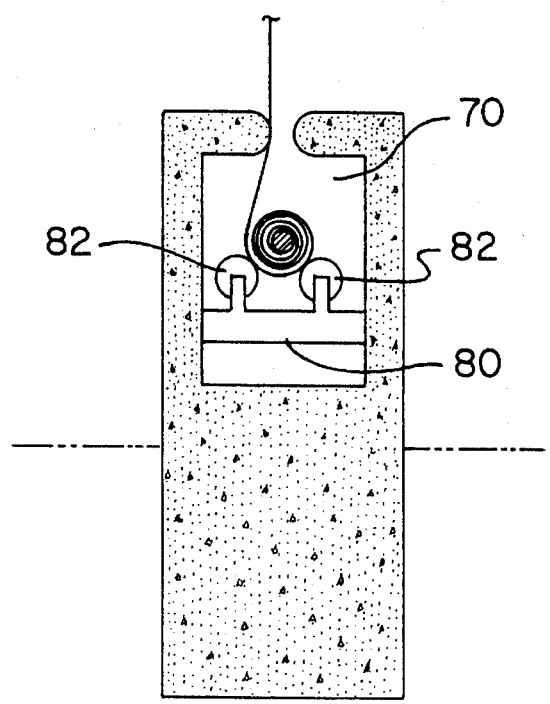
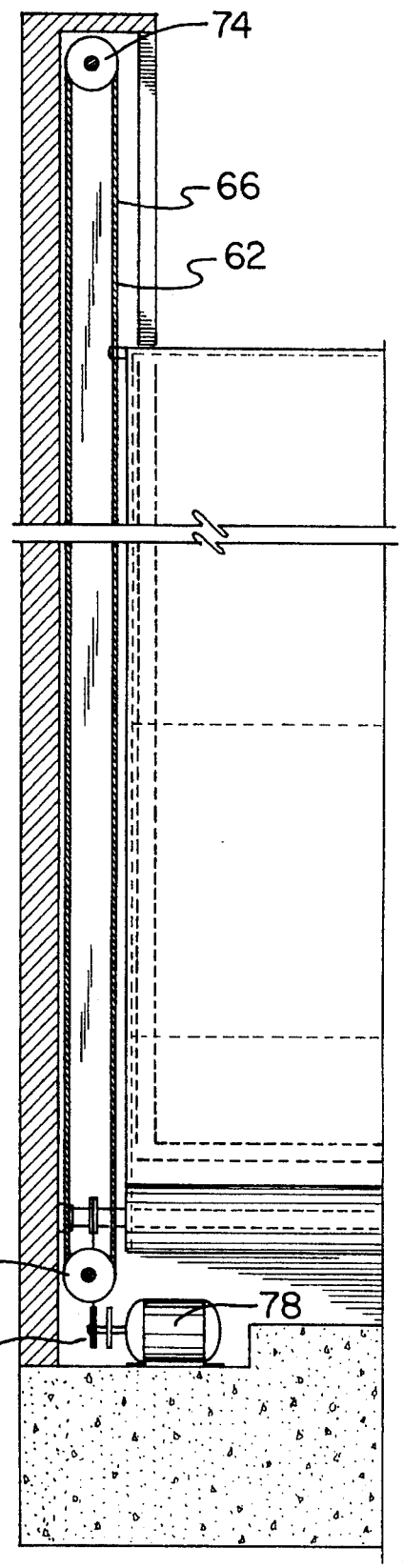
FIG. 9
FIG. 10
FIG. 11

VERTICAL AXIS WIND MILL WITH RETRACTABLE SAILS

BACKGROUND OF THE INVENTION

1. Field of the Invention

The present invention relates to a vertical axis wind mills with retractable sails and more particularly pertains to generating electrical energy through the rotation of vanes through wind power.

2. Description of the Prior Art

The use of wind mills is known in the prior art. More specifically, wind mills heretofore devised and utilized for the purpose of generating electricity are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,561,826 to Taylor discloses a vertical axis wind turbine.

U.S. Pat. No. 4,784,568 to Benesh discloses a wind turbine system using a vertical axis savonius-type rotor.

U.S. Pat. No. 4,818,180 to Liu discloses a vertical axle wind turbine.

U.S. Pat. No. 5,133,637 to Wadsworth discloses a vertical axis wind turbine generator.

Lastly, U.S. Pat. No. 5,183,386 to Feldman et al discloses a vertical axis sail bladed wind turbine.

In this respect, the vertical axis wind mill with retractable sails according to the present invention substantially departs from the conventional concepts and designs of the prior art, and in doing so provides an apparatus primarily developed for the purpose of generating electrical energy through the rotation of vanes through wind power.

Therefore, it can be appreciated that there exists a continuing need for new and improved vertical axis wind mills with retractable sails which can be used for generating electrical energy through the rotation of vanes through wind power. In this regard, the present invention substantially fulfills this need.

SUMMARY OF THE INVENTION

In view of the foregoing disadvantages inherent in the known types of wind mills now present in the prior art, the present invention provides an improved vertical axis wind mill with retractable sails. As such, the general purpose of the present invention, which will be described subsequently in greater detail, is to provide a new and improved vertical axis wind mill with retractable sails and method which has all the advantages of the prior art and none of the disadvantages.

To attain this, the present invention essentially comprises a vertical axis wind mill with retractable sails comprising a central core which has vertical side walls in a generally cylindrical configuration. The core has an upper end and a lower end and a drive shaft positioned along the central axis therefor. The drive shaft has an upper end and a lower end. The core also has curved vanes extending radially outwardly therefrom for rotation under the force of the wind to rotate the core and the drive shaft. The device also includes a fixed support which receives the shaft through bearings to allow for rotation of the core while the upper support remains fixed. Also included is a housing with a generator located within the lower extent of the housing beneath the core. The generator has an upper end secured to the lower end of the shaft for generating electricity in response to rotation of the shaft. A plurality of generally U-shaped brackets are secured at their inboard end to the upper support and adapted to rest on the ground at their lower extent with a sail located within each U-shaped bracket. Each bracket is adapted to support the sail at its side and bottom edges. Also included are support cables which run horizontally through the sails at spaced locations. The sails are angled with respect to the radius of the core for directing the winds toward the vanes. The lower extent of each U-shaped member is a housing for coiling up a sail through its downward movement in the event of high winds or a storm and drive means with a pulley system for raising and lowering the sails at the discretion of the user.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways.. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved vertical axis wind mills with retractable sails which have all the advantages of the prior art wind mills and none of the disadvantages.

It is another object of the present invention to provide new and improved vertical axis wind mills with retractable sails which may be easily and efficiently manufactured and marketed.

It is further object of the present invention to provide new and improved vertical axis wind mills with retractable sails which are of durable and reliable constructions.

An even further object of the present invention is to provide new and improved vertical axis wind mills with retractable sails which are susceptible of a low cost of manufacture with regard to both materials and labor, and which accordingly are then susceptible of low prices of sale to the consuming public, thereby making such vertical axis wind mills with retractable sails economically available to the buying public.

Still yet another object of the present invention is to provide new and improved vertical axis wind mills with retractable sails which provide in the apparatuses and methods of the prior art some of the advantages thereof, while simultaneously overcoming some of the disadvantages normally associated therewith.

Even still another object of the present invention is to generate electrical energy through the rotation of vanes through wind power.

Lastly, it is an object of the present invention to provide new and improved vertical axis wind mills with retractable sails comprising a central core which has vertical side walls in a generally cylindrical configuration. The core has an upper end and a lower end and a drive shaft positioned along the central axis therefor. The drive shaft has an upper end and a lower end. The core also has curved vanes extending radially outwardly therefrom for rotation under the force of the wind to rotate the core and the drive shaft. The device also includes a fixed support which receives the shaft through bearings to allow for rotation of the core while the upper support remains fixed. Also included is a housing with a generator located within the lower extent of the housing beneath the core. The generator has an upper end secured to the lower end of the shaft for generating electricity in response to rotation of the shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 9 is a cross sectional view taken along line 9—9 of FIG. 7.

FIG. 10 is a cross sectional view taken along line 10—10 of FIG. 7.

FIG. 11 is a cross sectional view taken along line 11—11 of FIG. 8.

The same reference numerals refer to the same parts through the various Figures.

DESCRIPTION OF THE PREFERRED EMBODIMENT

Figure 1:
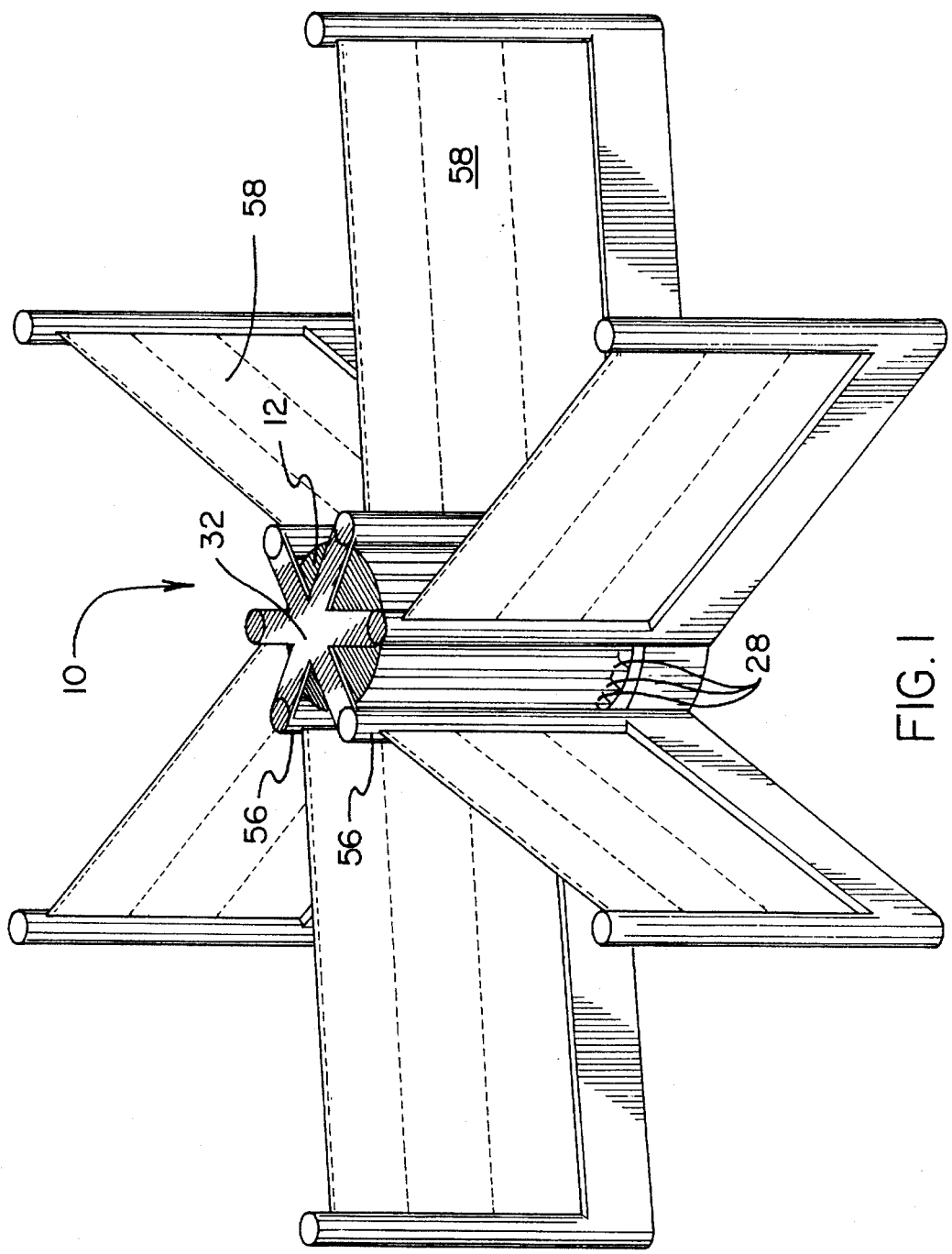
FIG. 1 is a perspective illustration of the preferred embodiment of the new and improved vertical axis wind mill with retractable sails constructed in accordance with the principles of the present invention.
Figure 2:
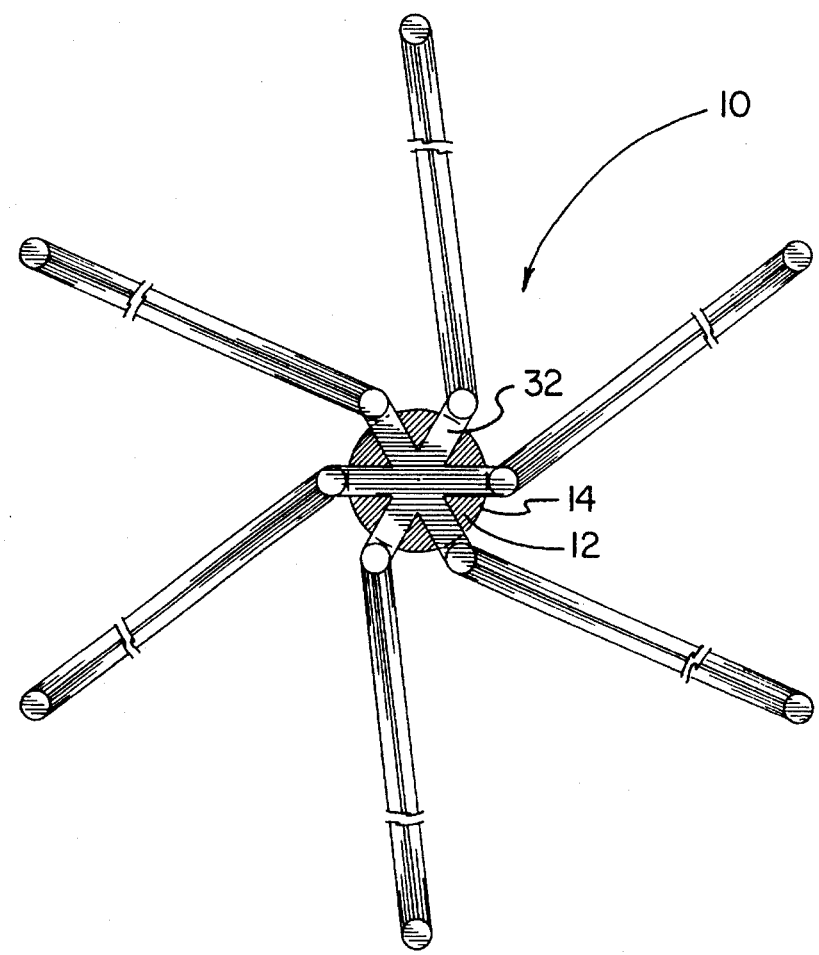
FIG. 2 is top plan view illustrating the device shown in FIG. 1.
Figure 3:
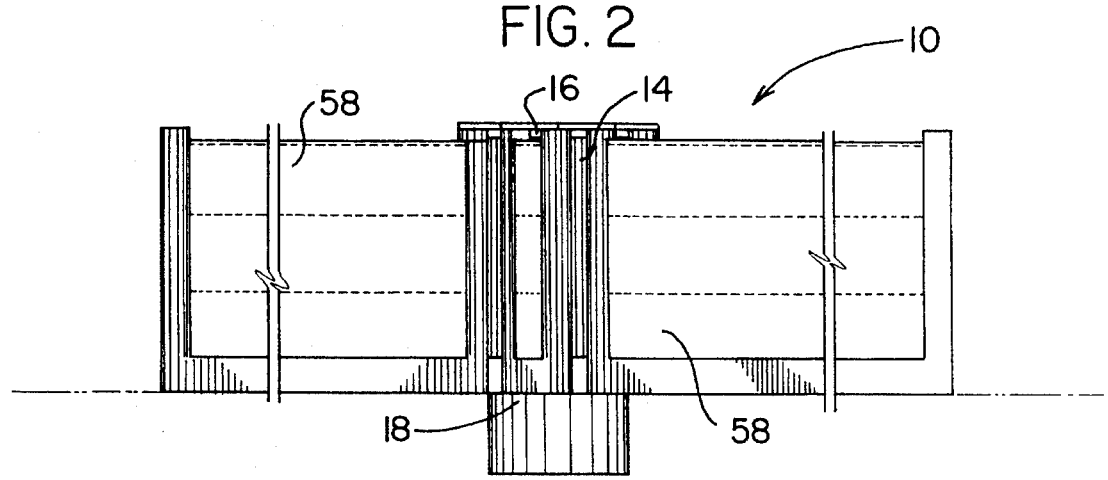
FIG. 3 is a front elevational view of the device of FIGS. 1 and 2.
Figure 4:
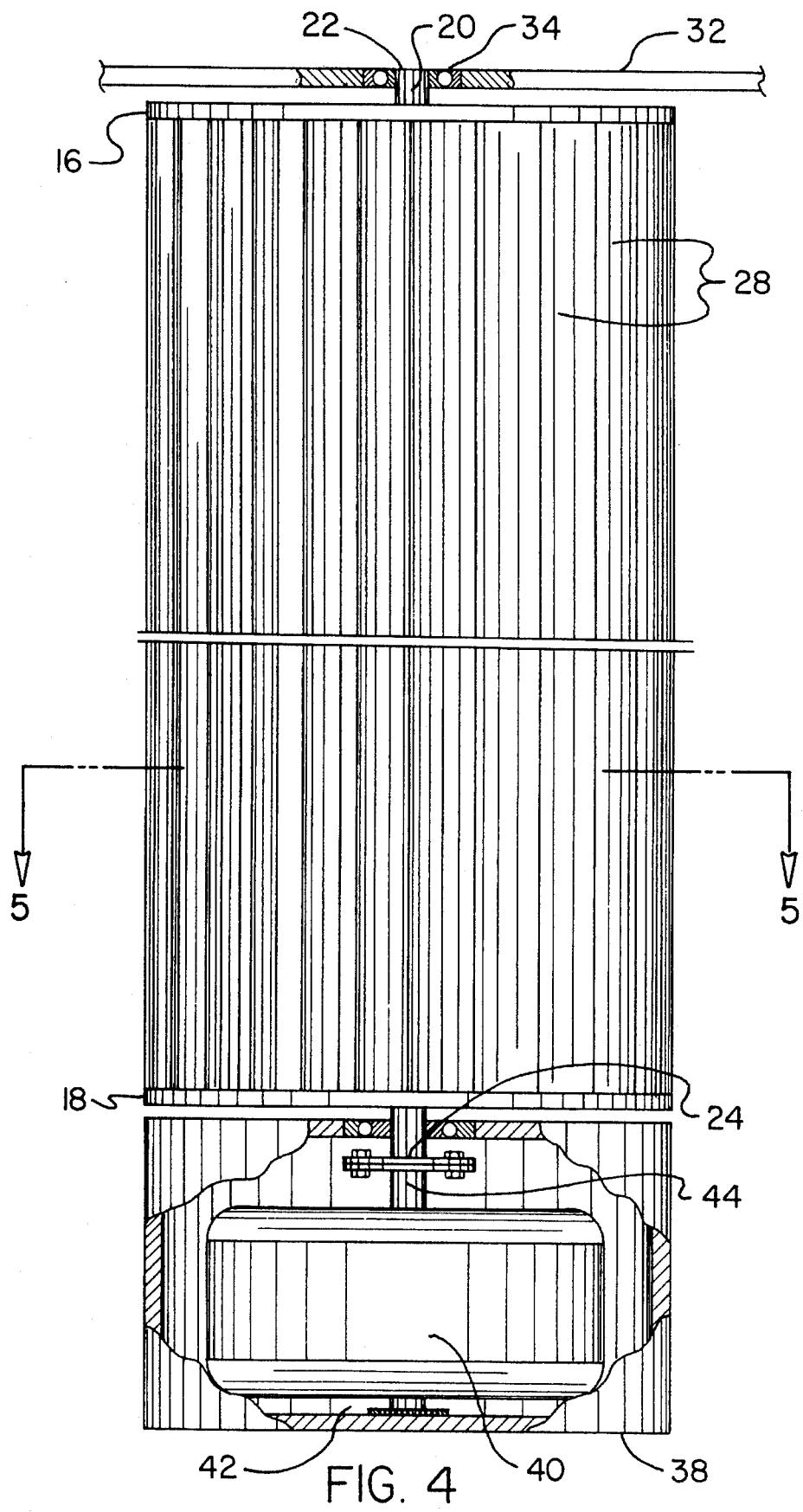
FIG. 4 is a front elevational view of the central core of the device of the prior Figures.
Figure 5:
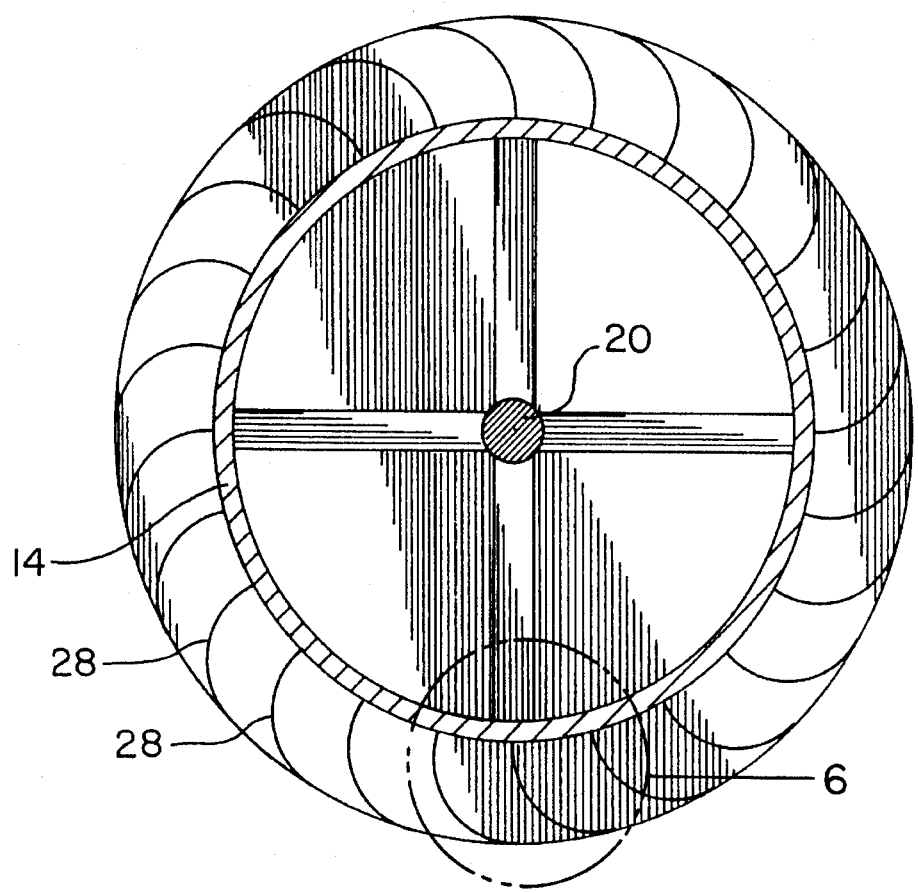
FIG. 5 is a cross sectional view taken along line 5—5 of FIG. 4.
Figure 6:
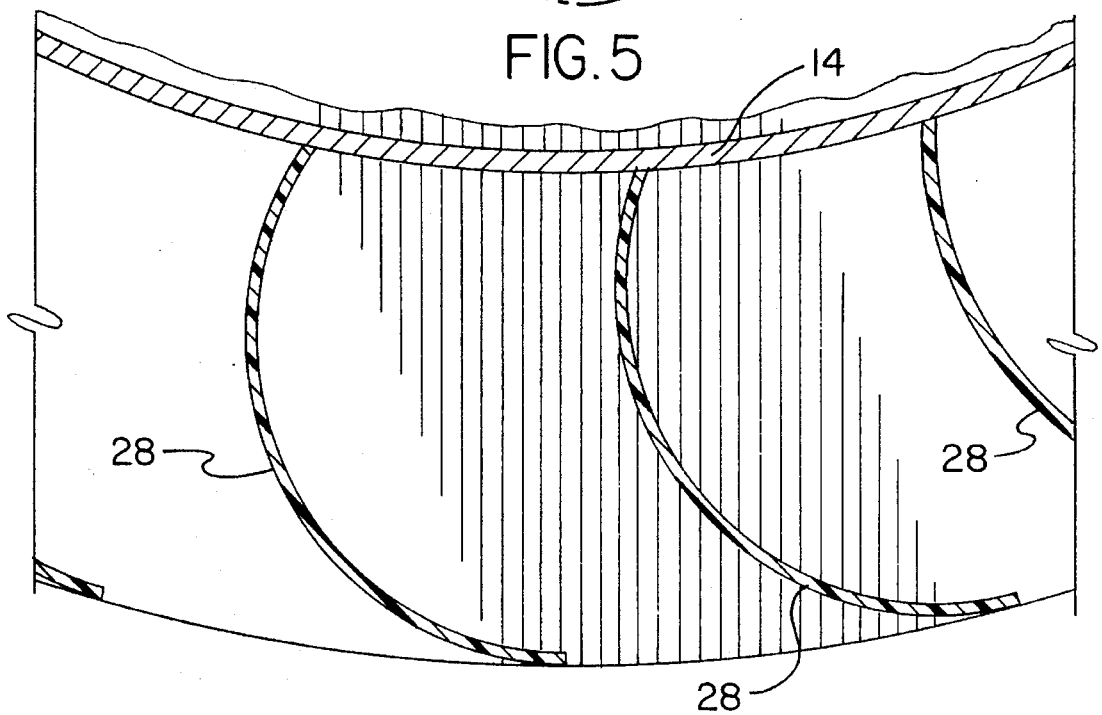
FIG. 6 is an enlarged top plan view of one segment of the device taken at circle six of FIG. 5.
Figure 7:
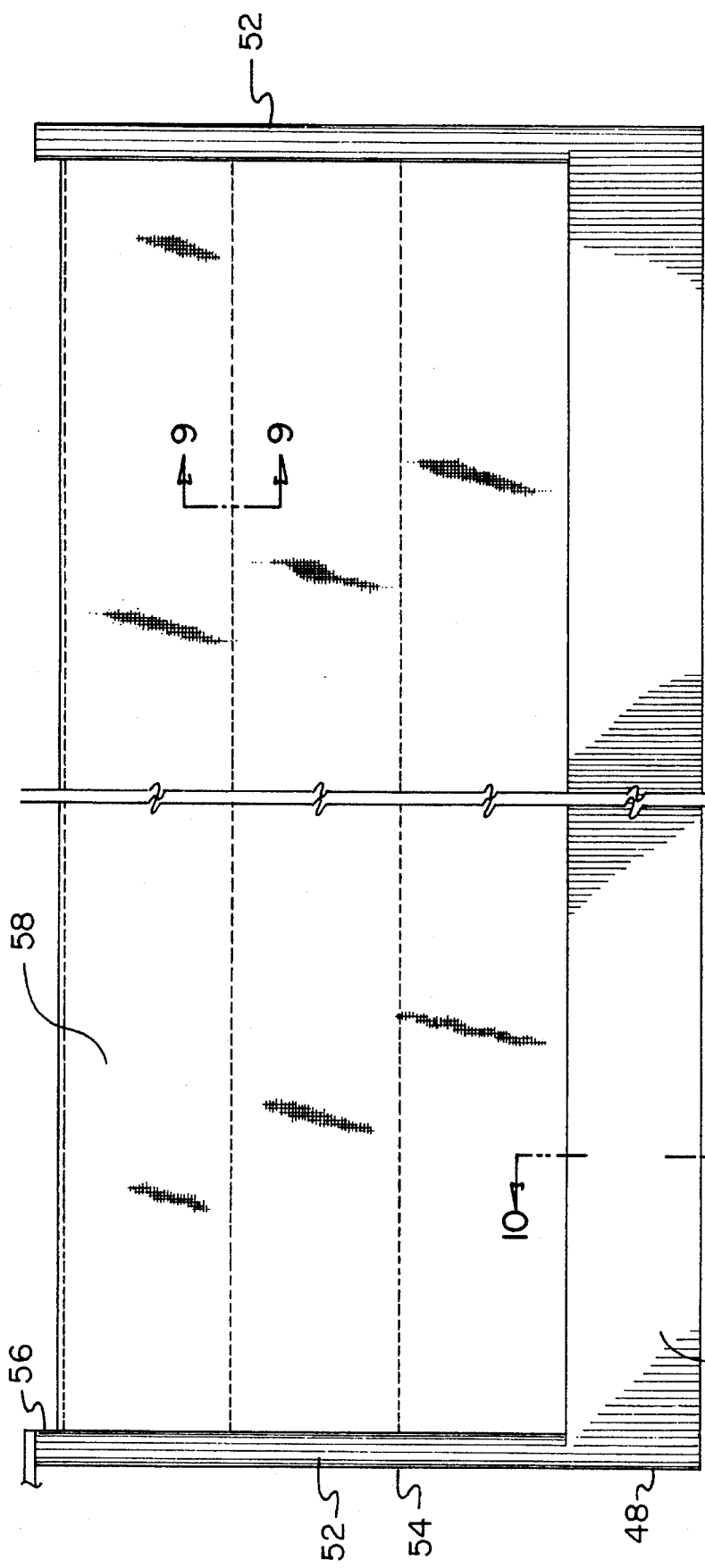
FIG. 7 is a front elevational view one of the sails of the device of FIGS. 1, 2 and 3.
Figure 8:
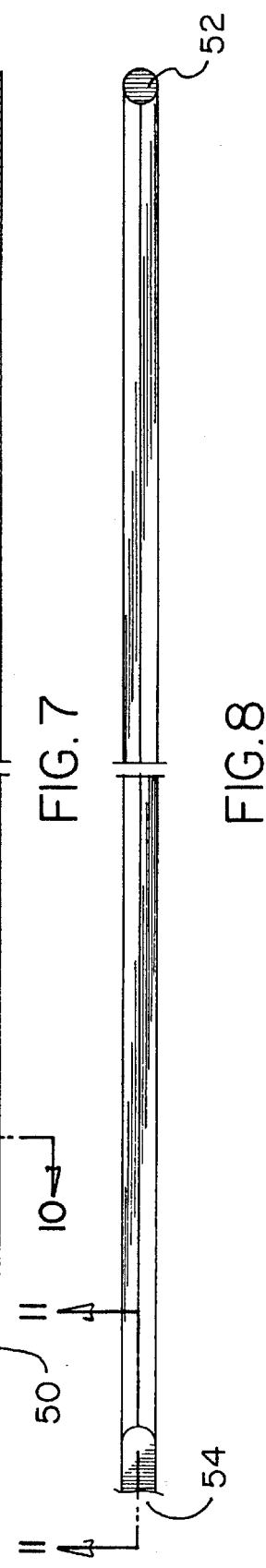
FIG. 8 is an end elevational view illustrating the device shown in FIG. 7.

With reference now to the drawings, and in particular to FIG. 1 thereof, the preferred embodiment of the new and improved vertical axis wind mill with retractable sails embodying the principles and concepts of the present invention and generally designated by the reference numeral 10 will be described.

The present invention, the new and improved vertical axis wind mill with retractable sails is a system comprised of a plurality of individual components. In their broadest context, such components include a central core, a fixed upper support, a housing with a generator, U-shaped brackets and a support cable assembly. Such components are individually configured and correlated with respect to each other to attain the desired objectives.

More specifically, the central core 12 is a vertically disposed member with vertical side walls 14. Such side walls are in a cylindrical configuration. The core has an upper end 16 and a lower end 18. It also has a drive shaft 20 vertically positioned along the central axis of the core. The drive shaft has an upper end 22 and a lower end 24.

Motion is provided to the core through a plurality of curved vanes 28. The vanes are curved about a vertical axis of rotation. The vanes individually extend radially outwardly from the core. Rotation thereof is effected through the force of the wind tending to rotate the vanes, core and drive shaft.

Secured with respect to the core and shaft is a horizontally positioned fixed upper support 32. The center of the support is adapted to receive the upper end of the shaft. Rotation therebetween is effected through a bearing assembly 34. This allows for the rotation of the core while the upper support remains fixed.

Located beneath the central core is a housing 38. The housing includes a generator 40 located within the lower extent 42 of the housing and beneath the core. The generator has an upper end 44 adapted to be secured to the lower end of the shaft for rotation therewith. Rotation functions for generating electricity in response to the rotation of the shaft.

Next provided are a plurality of generally U-shaped brackets 48. The brackets have large lower horizontal extents 50 and smaller upper vertical extents 52 extending upwardly from the ends of the lower extent. The brackets are secured at their inboard ends 54 to their upper support at their upper ends 56 and are adapted to rest on the ground at their lower extents. Within the confines of each U-shaped bracket is a sail 58. The sail is thus supported within and by the inner periphery of each U-shaped bracket. Each bracket thus supports a sail at its sides and bottom edges.

In association with each sail is a support cable assembly 62. The support cable assembly includes a cable 64 running horizontally through the sail at spaced locations. The cables also include a vertical cable 66 at the edge of each sail. The sails are adapted to reside in a vertical plane extending outwardly from the core. They are adapted to be angled with respect to the radius of the core for directing the winds towards the vanes.

The lower extent of each U-shaped member constitutes a housing 70 for coiling up of its associated sail through the downward movement thereof in the event of high winds or a storm. Drive means 72 are provided with a pulley system 74 and a drive cable 66 in a closed loop configuration around the pulleys. A drive motor 78 with a double gear coupled to the lower pulley translates the rotation of the motor into rotation of the lower pulley to provide lateral movement to the edge of each sail. In association with that, such motion also provides a fixed core 80 upon which the sail may be rotated during its movement into or from the lower extent of the U-shaped bracket. Idler rollers 82 support the sail material when within the lower member.

After the Arab oil embargo in the early 1970s, researchers began to look in earnest at alternative forms of energy. Americans saw first hand that the inflated price of gas and oil could quickly threaten our prosperity. Any great economic system needs fuel to run its economic engine. Without cheap energy, the American standard of living has declined dramatically since the early 1970s. The Carter administration, fearing this dependence on foreign oil, began a program to encourage the exploration of alternative energy sources. This included tax breaks for people who installed alternative energy hardware on their houses. It was at this time that we saw solar panels pop up on many roof tops and wind mills appear on the landscape. Harnessing solar and wind power, which are both limitless in supply, given the right weather conditions, and safe, could provided homes and businesses with cheap and abundant energy systems.

The current crop of wind mills has problems, however. In order to effectively harness the wind and provide enough electricity to make it worthwhile, planners must either build a very large windmill or a series of smaller windmills. Both of these alternatives are costly and have other design flaws associated with them.

The present invention builds upon the conventional windmill design to provide a more cost-effective and efficient system. One average size windmill would supply all the needed energy. The present invention uses two tricks to help achieve this. First there are at least six canvas sails attached to the front of the wind mill. These sails help draw more wind into the mill to produce more electricity. In addition, the blades of the wind turbine are pitched at an angle to help draw in more wind. In the event of a storm such as a hurricane, the sails can be retracted into the walls or around the outside poles via pulleys at the top of the sails.

The present invention will be placed on a hill to further increase the amount of wind available to it. The wind blows into the sails, which directs it into the turbine. The angle of the turbine blades helps increase the amount of power applied to a generator that is attached to electrical lines into the building. The wind supplies the power and the generator creates the electricity when the turbine turns.

The present invention should increase the likelihood of people to buy the present invention because it makes installing a wind mill more attractive to the general public.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vertical axis wind mill with retractable sails comprising, in combination:

a central core having vertical side walls in a generally cylindrical configuration the core having an upper end and a lower end and a drive shaft vertically positioned along the central axis therefor, the drive shaft having an upper end and a lower end, the core also having curved vanes extending radially outwardly therefrom for rotation under the force of the wind to rotate the core and the drive shaft;

a fixed upper support receiving the shaft through bearings to allow for rotation of the core while the upper support remains fixed;

a housing with a generator located within the lower extent of the housing beneath the core, the generator having an upper end secured to the lower end of the shaft for generating electricity in response to rotation of the shaft;

a plurality of generally U-shaped brackets, each bracket having an inboard end and a lower extent, secured at their inboard end to the upper support and adapted to rest on the ground at their lower extent with a sail located within each U-shaped bracket, each bracket adapted to support the sail at its side and bottom edges;

support cables running horizontally through the sails at spaced locations, the sails being angled with respect to the radius of the core for directing the winds toward the vanes, the lower extent of each U-shaped bracket defining a housing for coiling up a sail through its downward movement in the event of high winds or a storm and drive means in the bracket housing with a pulley system for raising and lowering the sails at the discretion of the user.

2. A vertical axis wind mill with retractable sails comprising:

a central core having vertical side walls in a generally cylindrical configuration, the core having an upper end and a lower end and a drive shaft positioned along the central axis therefor, the drive shaft having an upper end and a lower end, the core also having curved vanes extending radially outwardly therefrom for rotation under the force of the wind to rotate the core and the drive shaft;

a fixed support receiving the shaft through bearings to allow for rotation of the core while the support remains fixed;

a housing with a generator located within the lower extent of the housing beneath the core, the generator having an upper end secured to the lower end of the shaft for generating electricity in response to rotation of the shaft; and a plurality of generally U-shaped brackets, each bracket having an inboard end and a lower extent with the brackets being secured at their inboard end to the support and adapted to rest on the ground at their lower extent with a sail located within each U-shaped bracket, each bracket adapted to support the sail at its side and bottom edges.

* * * * *